US012791398B2

(12) United States Patent
Jamison et al.

(10) Patent No.: US 12,791,398 B2
(45) Date of Patent: Nov. 10, 2026

(54) THERMAL DETECTION ASSEMBLIES AND METHODS

(71) Applicant: The Boeing Company, Arlington, VA (US)

(72) Inventors: Brandon Parker Jamison, Ladson, SC (US); Michael Lloyd Sangwin, Everett, WA (US)

(73) Assignee: The Boeing Company, Arlington, VA (US)

( * ) Notice: Subject to any disclaimer, the term of this patent is extended or adjusted under 35 U.S.C. 154(b) by 506 days.

(21) Appl. No.: 18/451,151

(22) Filed: Aug. 17, 2023

(65) Prior Publication Data

US 2025/0060258 A1 Feb. 20, 2025

(51) Int. Cl.

| | |
|---|---|
| ***G01K 5/48*** | (2006.01) |
| ***B64D 45/00*** | (2006.01) |
| ***G01K 1/08*** | (2021.01) |

(52) U.S. Cl.

CPC ............... *G01K 5/48* (2013.01); *B64D 45/00* (2013.01); *G01K 1/08* (2013.01)

(58) Field of Classification Search

CPC . G01K 5/48; G01K 1/08; G01K 11/06; B64D 45/00

See application file for complete search history.

(56) References Cited

U.S. PATENT DOCUMENTS

| | | | | | |
|---|---|---|---|---|---|
| 2,484,585 | A | * | 10/1949 | Quinn | G01K 1/14 374/185 |
| 3,277,860 | A | * | 10/1966 | Lindberg, Jr. | G08B 17/06 60/527 |
| 4,034,698 | A | * | 7/1977 | Durand | G01K 5/20 374/E5.014 |
| 4,119,284 | A | * | 10/1978 | Belmont | B61K 9/04 116/DIG. 38 |
| 4,818,119 | A | * | 4/1989 | Busch | G01K 11/00 374/E11.006 |
| 4,947,786 | A | * | 8/1990 | Maynard | G01K 11/06 374/E11.006 |
| 5,033,865 | A | * | 7/1991 | Kuze | G05D 23/021 60/527 |
| 5,046,447 | A | * | 9/1991 | Steinke | G01K 11/06 374/E11.006 |

(Continued)

*Primary Examiner* — Brandi N Hopkins
*Assistant Examiner* — Tania Courson
(74) *Attorney, Agent, or Firm* — Mary D. Lawlor; Carroll, Hoette & Butscher, LLC

(57) ABSTRACT

A thermal detection assembly includes a housing extending between a first end and a second end. The first end of the housing being operably coupled with a surface of a power system and the housing extending through a passage of the surface. The housing includes interior surfaces defining a cavity that has an opening proximate the second end of the housing. An indicator device is disposed within the cavity and is engaged with a thermal spring system. Characteristics of the thermal spring system change responsive to being exposed to a temperature exceeding a designated threshold. The thermal spring system controls movement of the indicator device to move the indicator device from a first position to a second position responsive to the characteristics changing. A portion of the indicator device moves out of the cavity responsive to the thermal spring system moving the indicator device to the second position.

18 Claims, 5 Drawing Sheets

(56) References Cited

U.S. PATENT DOCUMENTS

| | | | | | |
|---|---|---|---|---|---|
| 5,203,278 | A * | 4/1993 | Kinney | G01K 3/00 | 411/8 |
| 5,642,717 | A * | 7/1997 | Gilman | F02B 77/089 | 374/185 |
| 6,203,114 | B1 * | 3/2001 | Ehrlich | G01K 11/06 | 374/E11.006 |
| 6,546,892 | B2 * | 4/2003 | Kelly, Jr. | G01K 1/02 | 374/E1.002 |
| 7,607,402 | B2 * | 10/2009 | Petrakis | A61M 31/002 | 116/214 |

* cited by examiner

THERMAL DETECTION ASSEMBLIES AND METHODS

FIELD OF THE DISCLOSURE

Examples of the present disclosure generally relate to thermal detection assemblies and methods for operating the thermal detection assemblies.

BACKGROUND OF THE DISCLOSURE

Commercial turbofan nacelles of aircraft systems may be manufactured of various materials that have different material and/or thermal properties. For example, nacelle fan ducts may be manufactured from aluminum or composite materials, and nacelle structures may be manufactured of layers of bonded composite materials that may be susceptible to damage due to exposure to increased temperatures. For example, at least some of the layers of the bonded composite nacelle structures may be compromised after exposure to increased temperatures generated by a propulsion system of the aircraft system.

In order to regularly inspect the materials of the nacelle fan ducts and/or nacelle structure, an operator must remove thermal blankets that cover some of the fan ducts and/or nacelle structures. The thermal blankets may be designed to control an amount of exposure of the fan ducts and/or structures from thermal energy generated by the propulsion system.

However, the process of removing of the thermal blankets is a cumbersome activity, and can cause damage to the fan ducts, the nacelle structures, and the thermal blankets during the removal process and/or the reapplication process after an inspection event has been completed. Moreover, an operator is unable to determine if the fan ducts and/or structures have been compromised due to exposure to excess thermal energy without removing the thermal blankets from the fan ducts and/or structures, and therefore must regularly inspect the fan ducts and/or nacelle structures. For example, the thermal blankets may needlessly be removed during a regular maintenance activity even though the fan ducts and/or structures have not experienced any thermal damage.

SUMMARY OF THE DISCLOSURE

A need exists for a thermal detection system and a method for indicating when one or more materials of an aircraft system may have been damaged due to exposure to thermal energy. Further, a need exists for a passive detection system that can indicate where and/or when thermal damage has occurred, and as a result no longer requires regular inspections of the aircraft system.

With those needs in mind, certain examples of the present disclosure provide a thermal detection assembly for a power system, such as an aircraft system. The thermal detection assembly can include a housing that is operably coupled with a surface of the aircraft system at a first end of the housing, and extends through a passage of the surface of the aircraft system. The housing includes plural interior surfaces that define a cavity that has an opening that is proximate to a second end of the housing. An indicator device and a thermal spring system are disposed within the cavity of the housing. The thermal spring system is engaged with the indicator device and maintains a position of the indicator device within the cavity. One or more characteristics of the thermal spring system may change responsive to the thermal spring system being exposed to a temperature exceeding a designated threshold. The thermal spring system controls movements of the indicator device to move the indicator device from a first position to a different, second position responsive to the one or more characteristics of the thermal spring system changing. A first portion of the indicator device is configured to move out of the cavity of the housing responsive to the thermal spring system moving the indicator device to the second position.

In at least one example, the surface of the power system includes plural layers that are operably coupled with each other. One or more characteristics of one or more of the plural layers may also change responsive to the plural layers being exposed to the temperature exceeding the designated threshold. For example, one or more of the plural layers may be one or more common or similar material and/or thermal properties as one or more materials of the thermal spring system. In at least another example, the surface of the power system may include plural layers operably coupled with each other. The thermal spring system may be manufactured of one or more materials. At least one of the plural layers and at least one of the one or more materials of the thermal spring system may have a common material property.

In at least one example, the thermal spring system may disengage from a second portion of the indicator device responsive to the one or more characteristics of the thermal spring system changing. The thermal spring system is configured to encourage the first portion of the indicator device to move out of the cavity of the housing responsive to the thermal spring system disengaging from the second portion of the indicator device.

In at least one example, the one or more characteristics of the thermal spring system may change responsive to the thermal spring system being exposed to the temperature exceeding the designated threshold for a determined length of time.

In at least one example, the thermal spring system may include a spring device and a thermal component. The indicator device extends between a third end and a fourth end. The spring device may be operably coupled with the indicator device at a location between the third end and the fourth end of the indicator device, and the thermal component may be operably coupled with the third end of the indicator device. In another example, the spring device may be in a compressed state prior to the thermal spring system being exposed to the temperature exceeding the designated threshold, and the spring device may be in a non-compressed state responsive to the thermal spring system being exposed to the temperature exceeding the designated threshold. In another example, the thermal component may have a first shape prior to being exposed to the temperature exceeding the designated threshold, and the thermal component may have a different, second shape responsive to the thermal spring system being exposed to the temperature exceeding the designated threshold.

In at least one example, the thermal spring system may include a spring device, and one or more characteristics of the spring device may change responsive to the spring device being exposed to the temperature exceeding the designated threshold. In another example, the spring device may have a first spring constant prior to being exposed to the temperature exceeding the designated threshold, and the spring device may have a different, second spring constant responsive to the spring device being exposed to the temperature exceeding the designated threshold.

In at least one example, the power system may be an aircraft system, and the surface of the power system may be a surface of a propulsion system of the aircraft system.

Certain examples of the present disclosure provide an assembly that includes a housing having a body that extends between a first end and a second end. The first end of the housing may be operably coupled with a surface of a power system. The body of the housing extends through a passage of the surface of the power system. The housing may include one or more interior surfaces that define a cavity. The cavity may have an opening proximate the second end of the housing. An indicator device may be disposed within the cavity of the housing. The indicator device extends between a third end and a fourth end, wherein the fourth end is disposed proximate the opening of the cavity. A thermal spring system may also be disposed within the cavity of the housing and is engaged with the indicator device. The thermal spring system maintains a position of the indicator device within the cavity. The thermal spring system includes a spring device and a thermal component. The spring device is operably coupled with the indicator device at a location between the third end and the fourth end of the indicator device, and the thermal component is operably coupled with the third end of the indicator device. One or more characteristics of the thermal component may change responsive to the thermal component of the thermal spring system being exposed to a temperature exceeding a designated threshold. The thermal spring system is configured to control movement of the indicator device to move the indicator device from a first position to a second position responsive to the one or more characteristics of the thermal component changing. A portion of the fourth end of the indicator device may move out of the cavity of the housing responsive to the thermal spring system moving the indicator device from the first position to the second position.

Certain examples of the present disclosure provide a thermal detection assembly that includes a housing that extends between a first end operably coupled with a surface of a propulsion system of an aircraft system, through a passage of the surface of the propulsion system, and to a second end of the housing. The housing includes interior surfaces that define a cavity that has an opening proximate to the second end of the housing.

An indicator device is disposed within the cavity, and a thermal spring system is disposed within the cavity and is engaged with the indicator device. The thermal spring system maintains a position of the indicator device within the cavity. One or more characteristics of the thermal spring system change responsive to the thermal spring system being exposed to an amount of thermal energy generated by the propulsion system exceeding a designated threshold. The thermal spring system encourages a portion of the indicator device to move out of the cavity of the housing responsive to the one or more characteristics of the thermal spring system changing.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
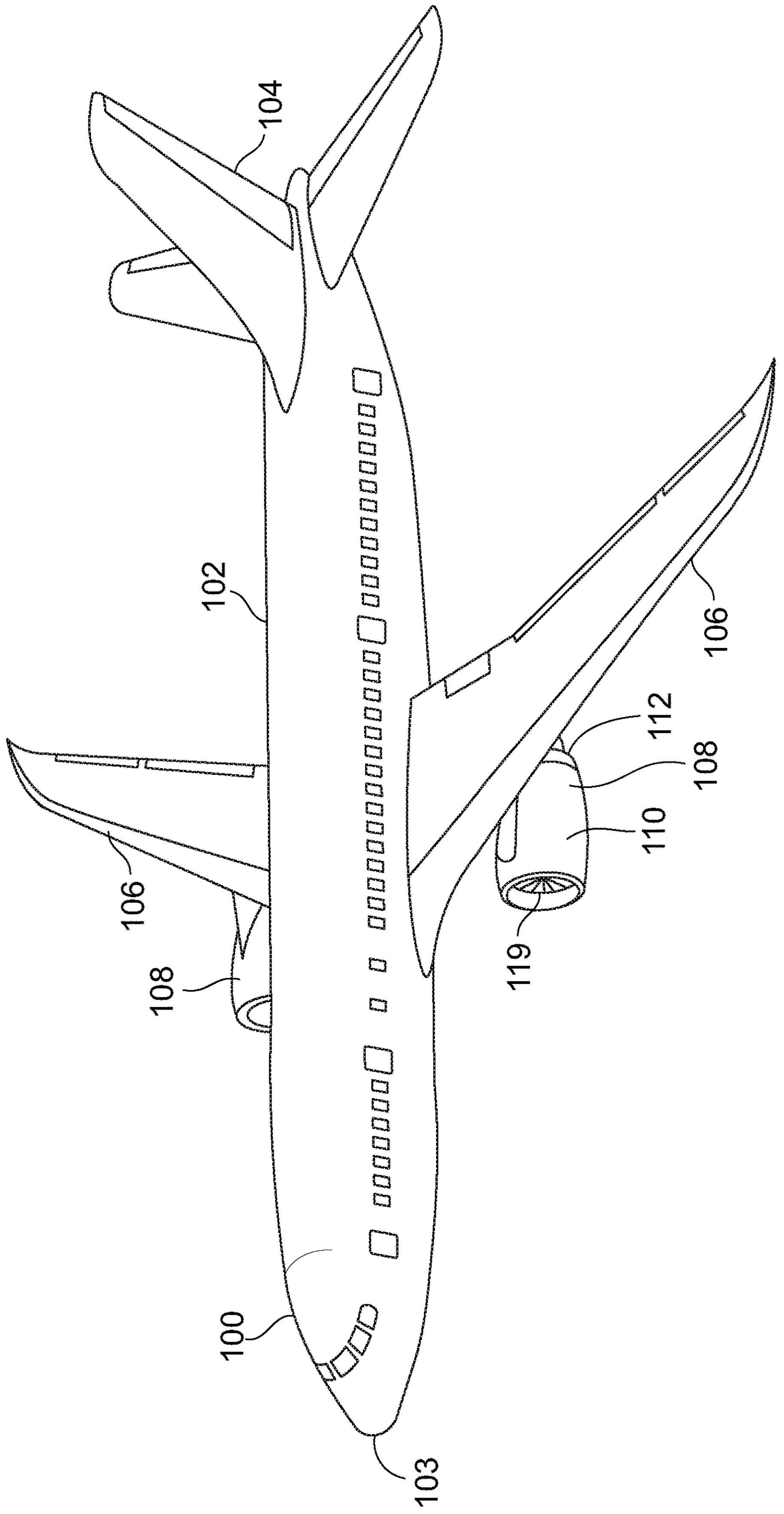
FIG. 1 illustrates a perspective view of an aircraft system, according to an example of the present disclosure.

Referring now to the drawings, which illustrate various embodiments of the present disclosure, FIG. 1 is a perspective illustration of an aircraft system 100. The aircraft system 100 may include a fuselage 102 extending from a nose 103 to an empennage 104. The empennage 104 may include one or more tail surfaces for directional control of the aircraft 100. The aircraft system 100 includes a pair of wings 106 extending from the fuselage 102. The aircraft system 100 includes one or more propulsion systems 108 which are optionally supported by the wings 106. In an embodiment, each propulsion system 108 may include or represent a gas turbine engine 119 surrounded by a nacelle 110. In an alternative embodiment, one or more of the propulsion systems 108 may include motor-driven rotors surrounded by the nacelle 110 instead of a gas turbine engine. For example, the motor of such propulsion systems 108 may be powered by electrical energy supplied by an onboard battery system and/or an onboard electrical energy generation system. The nacelle 110 may have an exhaust nozzle 112 (e.g., a primary exhaust nozzle and a fan nozzle) at an aft end of the propulsion system 108.

Figure 2:
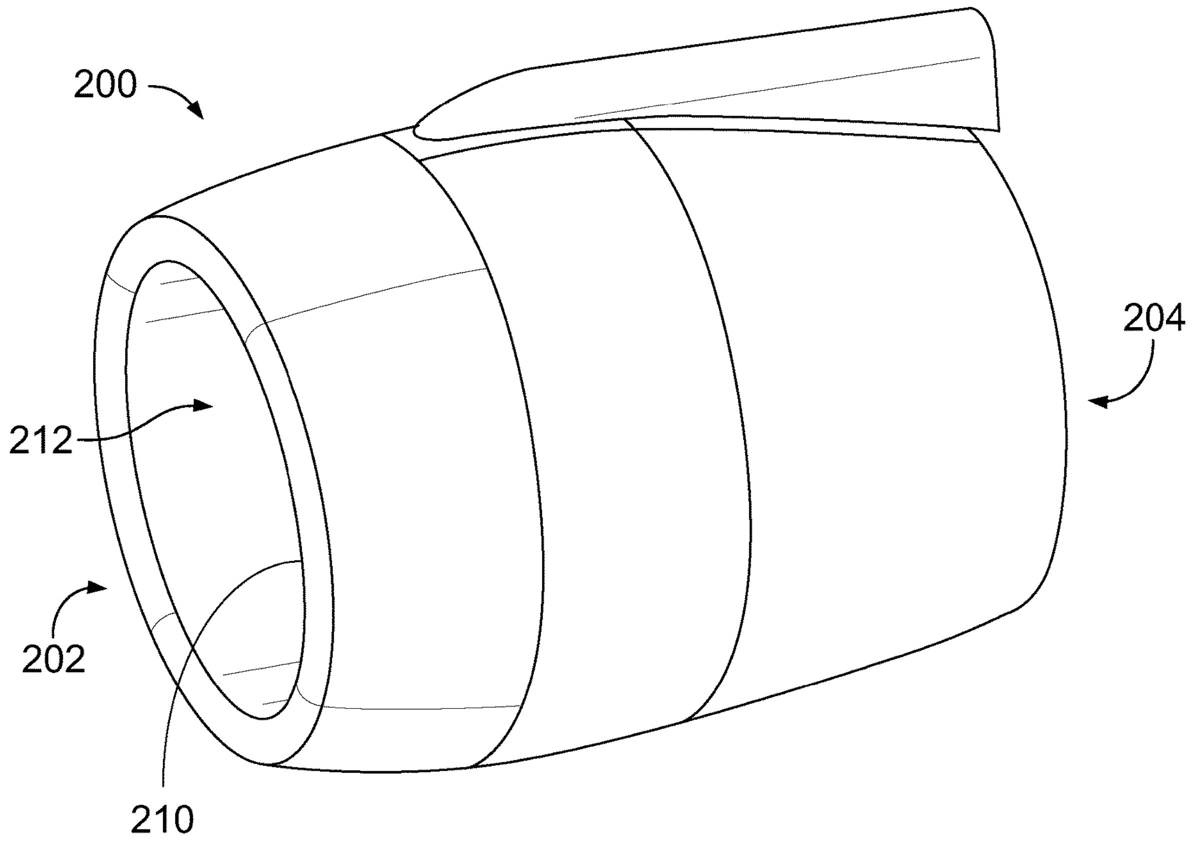
FIG. 2 illustrates a perspective view of a nacelle of a propulsion system of an aircraft system, according to an example of the present disclosure.

FIG. 2 illustrates an embodiment of a nacelle 200 of a propulsion system of an aircraft according to an embodiment. The nacelle 200 may be one of the nacelles 110 of the propulsion systems 108 shown in FIG. 1. The nacelle 200 extends a length from a front end 202 of the nacelle 200 to an aft end 204 of the nacelle 200 (opposite the front end 202). The nacelle 200 includes a leading edge 210 of the nacelle 200 at the front end 202, that directs air into a core 212 of the nacelle 200. The nacelle may include one or more different cowls and/or sections between the front end 202 and the aft end 204, that surround one or more fans, engine components (such as a compressor, combustion chamber or combustor, a turbine, or the like). An aft section of the nacelle may include or represent a thrust reverser, aft fairing, or the like. The aft end 204 may define an aft nozzle through which air and exhaust products are emitted from the propulsion system.

Figure 3:
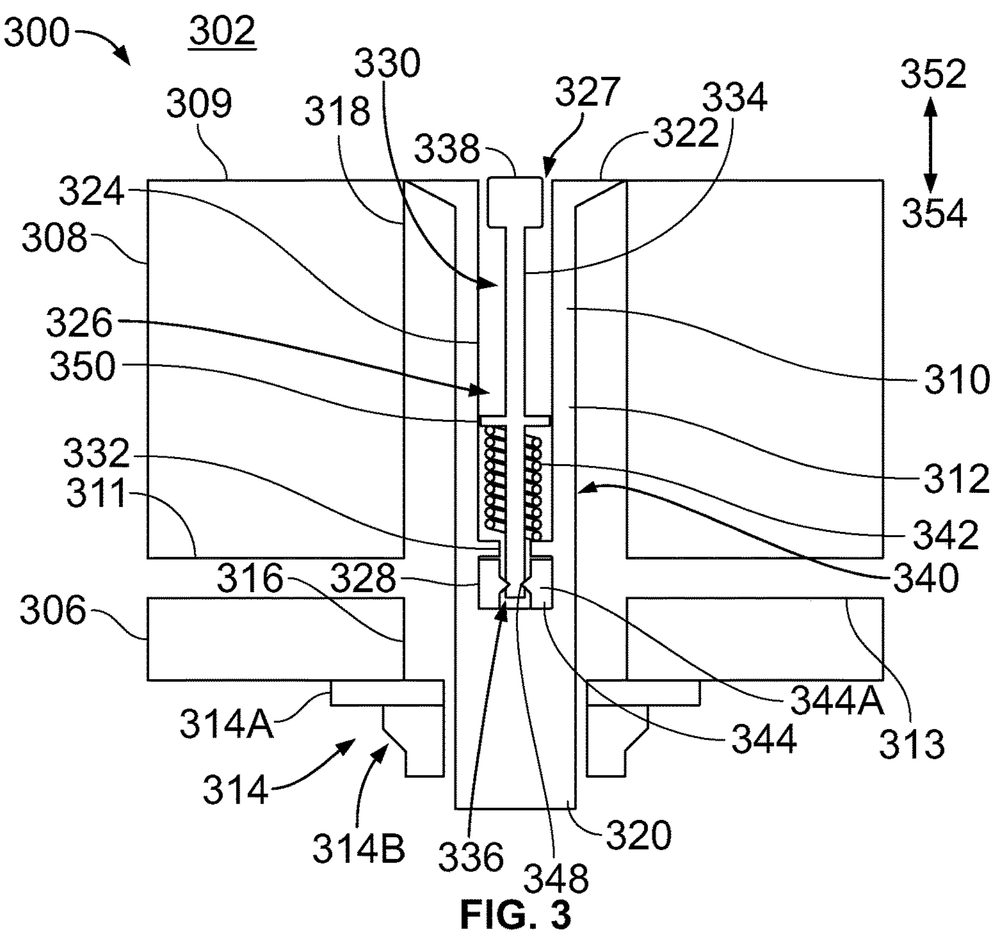
FIG. 3 illustrates a cross-sectional side view of a thermal detection assembly in a first state, according to an example of the present disclosure.

FIG. 3 illustrates a cross-sectional front view of a thermal detection assembly 300 operably coupled with a portion of the aircraft system 100. The portion of the aircraft system 100 may include one or more different surfaces, wherein each of the one or more different surfaces may include one or more layers of different and/or common materials. The thermal detection assembly 300 may be used to detect and/or monitor an amount of thermal energy that is generated by the aircraft system. For example, the thermal detection assembly 300 may be operably coupled with the surface of the aircraft system 100 at a location within and/or proximate to the propulsion system 108, such as a surface within the core 212 of the nacelle 200. Optionally, while the illustrated embodiments represent an aircraft system, the thermal detection assembly 300 may be used within other power systems that generate thermal energy.

In the illustrated example, the aircraft system includes a first surface 306 and a second surface 308. The second surface 308 extends between an exterior surface 309 and an opposite interior surface 311 that faces towards the an exterior surface 313 of the first surface 306. In the illustrated embodiment, the first and second surfaces 306, 308 are separated by a gap, but alternatively may be directly mating with each other. In one example, the first surface 306 may represent an insulation layer and/or insulation material disposed within the nacelle 200 of the aircraft system 100, such as a thermal blanket of the nacelle, and the second surface 308 may represent one or more layers of a duct system of the nacelle 200.

Figure 5:
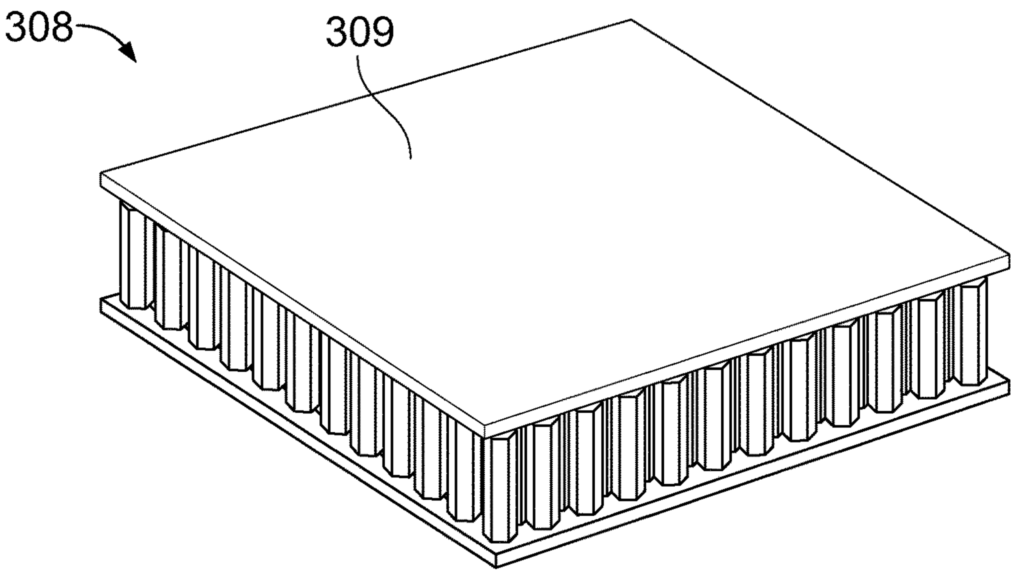
FIG. 5 illustrates a partial perspective view of a surface of an aircraft system, according to an example of the present disclosure.
Figure 6:
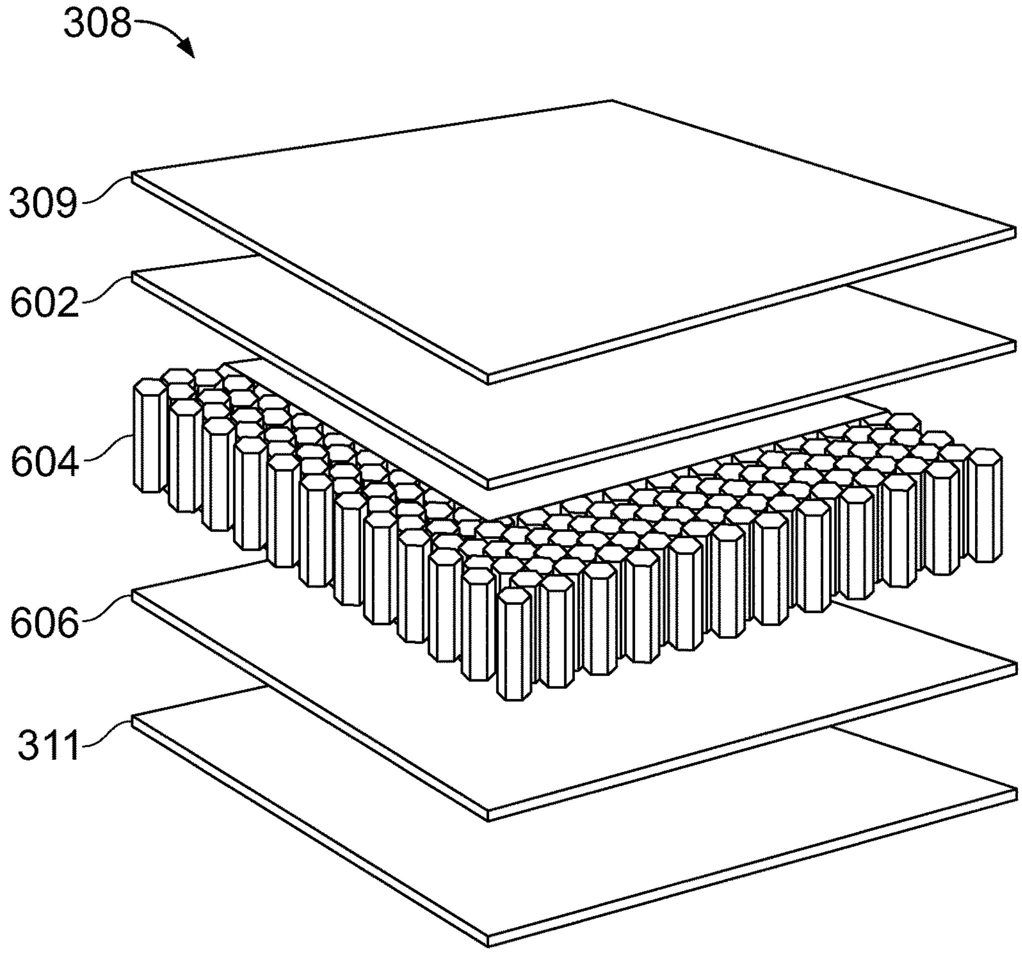
FIG. 6 illustrates an exploded perspective view of the surface of the aircraft system shown in FIG. 5.

For example, FIG. 5 illustrates a partial perspective view of the second surface 308 of the aircraft system 100 in accordance with one embodiment. FIG. 6 illustrates an exploded perspective view of the second surface 308. The second surface 308 includes the exterior surface 309, a first layer 602, a second layer 604, a third layer 606, and the interior surface 311. In one example, the exterior and interior surfaces 309, 311 may represent layers of a carbon fiber material, the first and third layers 604, 606 may represent layers of an adhesive material (such as epoxy, or the like), and the second layer 604 may represent a composite construction, such as a honeycomb composite structure. The first layer 602 (e.g., the first layer of epoxy) operably couples the carbon fiber exterior surface 309 with the second layer 604 honeycomb composite structure; and the third layer 606 (e.g., the second layer of epoxy) operably couples the carbon fiber interior surface 311 with the second layer 604 honeycomb composite structure.

In one embodiment, the first and third layers 602, 606 may be the same or substantially the same type of adhesive material, or alternatively may be different types of adhesive materials, may be different materials that have one or more different material properties, or the like. In another embodiment, the exterior and interior surfaces 309, 311 may be the same or substantially the same type of material (e.g., the same, substantially the same, or similar carbon fiber materials) such that the exterior and interior surfaces 309, 311 may have the same or substantially the same material properties. Alternatively, the exterior surface 309 may be a material or material composition that is different than a material or material composition of the interior surface 311 such that one or more material properties of the exterior surface 309 differ from one or more material properties of the interior surface 311.

FIGS. 5 and 6 illustrate one example of layers of a surface of an aircraft system. In another example, the second surface 308 may have an alternative arrangement of layers, may include one or more additional and/or alternative layers, may be devoid one or more layers illustrated in FIG. 6, or any combination therein. For example, in one or more alternative embodiments, the thermal detection assembly 300 may be operably coupled with a single surface of a portion of the propulsion system 108. The single surface may include one or more layers of different materials disposed therein and operably coupled with each other. In alternative embodiments, the thermal detection assembly 300 may be operably coupled with plural different surfaces of a portion of the propulsion system 108. One or more of the different surfaces may include one or more layers of different materials disposed therein and operably coupled with each other.

Returning to FIG. 3, the first surface 306 includes a passage 316 that is aligned with a passage 318 of the second surface 308. The thermal detection assembly 300 includes a housing 310 having a body 312 that is disposed within the passages 316, 318 of the first and second surfaces 306, 308. The body 312 extends between a first end 320 and a second end 322. The first end 320 of the body 312 is operably coupled with the first surface 306 via one or more fastener components 314. The illustrated example, the fastener components 314 includes a washer 314A and a nut 314B. For example, the first end 320 of the body 312 of the housing 310 may include threads (not shown) that allow the nut 314B to be operably coupled with the housing 310. In alternative examples, the housing 310 of the thermal detection assembly 300 may be coupled with the first surface 306 and/or the second surface 308 via alternative fastening components and/or arrangements.

The housing 310 includes one or more interior surfaces 324 that define a cavity 326. The cavity 326 has an opening 327 proximate the second end 322 of the housing 310. In the illustrated embodiment, the cavity 326 includes a first cavity compartment 328 and a second cavity compartment 330. The first and second cavity compartments 328, 330 are separated by one or more surfaces of the housing defining a cavity passage 332 extending between the first and second cavity compartments 328, 330.

The thermal detection assembly 300 includes an indicator device 334 that is disposed within the cavity 326. In the illustrated example, the indicator device 334 extends between a third end 336 and a fourth end 338. In the illustrated example, the third end 336 of the indicator device 334 extends through the cavity passage 332 and is disposed in the first cavity compartment 328. The fourth end 338 is disposed in the second cavity compartment 330 and proximate to the opening 327 of the cavity 326. The indicator device 334 also includes a flange 350 that extends away from the body of the indicator device 334.

The thermal detection assembly 300 includes a thermal spring system 340 that is disposed within the cavity 326. In the illustrated example, the thermal spring system 340 includes a spring device 342 that is disposed within the second cavity compartment 330, and a thermal component 344 that is disposed within the first cavity compartment 328. In one example, the spring device 342 is a compression spring that is operably coupled with (e.g., is wrapped around) the indicator device 334 at a location between the third and fourth ends 336, 338 of the indicator device 334. In the illustrated example, the spring device 342 is positioned between the flange 350 of the indicator device 334 and interior surfaces of the cavity 326 defining the first and second cavity compartments 328, 330. The spring device 342 is shaped, sized, and arranged to encourage movement of the indicator device 334 in a first direction 352.

The third end 336 of the indicator device 334 is operably coupled with the thermal component 344 within the first cavity compartment 328. In the illustrated example, the thermal component 344 is sized to substantially fill the first cavity compartment 328, and is shaped to include one or more retaining features 348. For example, the retaining features 348 may be shaped and sized to engage with the third end 336 of the indicator device 334 to maintain a position of the indicator device 334 within the cavity of the housing. In alternative examples, the thermal component 344 may have any alternative shape, alternative retaining features, or the like.

In the illustrated embodiment of FIG. 3, the thermal detection assembly 300 is in a first state 302. In the first state 302, the spring device 342 is in a compressed and/or loaded state, and the position of the indicator device 334 is maintained within the cavity 326 of the housing 310 by the thermal component 344. For example, the retaining features 348 of the thermal component 344 may be designed and/or arranged to exert a retention force onto the third end 336 of the indicator device 334 that is greater than a force that is generated by the spring device 342 and exerted onto the flange 350 of the indicator device 334. For example, the retention of the third end 336 of the indicator device 344 in a second direction 354 is greater than the spring force applied to the flange 350 in the first direction 352.

The state of the thermal detection assembly 300 changes responsive to the thermal spring system 340 being exposed to an amount and/or level of thermal energy that exceeds a designated threshold (e.g., a designated temperature threshold). For example, the thermal detection assembly 300 may be exposed to thermal energy (e.g., heat) that is generated by the propulsion system of the aircraft system. One or more characteristics (e.g., material properties, shapes, sizes, etc.) of one or more of the components of the thermal spring system 340 may change responsive to the components of the thermal spring system 340 being exposed to temperatures exceeding the designated threshold. For example, the spring device 342 and/or the thermal component 344 may be manufactured of one or more materials that have material properties, thermal properties, etc., that may change based on the materials being exposed to temperatures exceeding the designated threshold. Optionally, the one or more characteristics may change responsive to the materials of the spring device 342 and/or the thermal component 344 being exposed to temperatures exceeding the designated threshold for a determined length of time (e.g., 30 seconds, 1 minute, 10 minutes, 30 minutes, 1 hour, 5 hours, etc.). In one example, the length of time may be a consecutive length of time, or alternatively may be a cumulative length of time.

Figure 4:
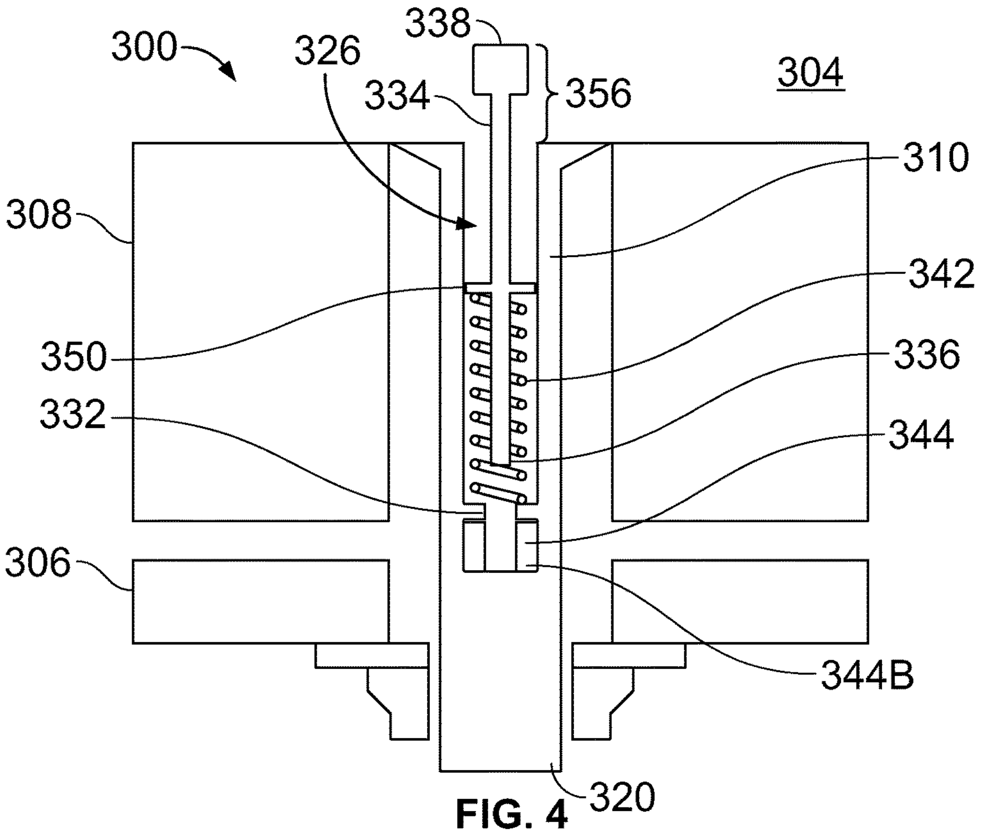
FIG. 4 illustrates a cross-sectional side view of the thermal detection assembly shown in FIG. 3 in a second state, according to an example of the present disclosure.

As one example, FIG. 4 illustrates a cross-sectional side view of the thermal detection assembly 300 in a second state 304. The thermal detection assembly 300 may move from the first state 302 to the second state 304 responsive to the thermal detection assembly 300 being exposed to temperatures or thermal energy exceeding the designated threshold, responsive to being exposed to temperatures exceeding the designated threshold for the determined length of the time, or the like. In the illustrated example, responsive to the thermal component 344 being exposed to temperatures exceeding the designated threshold, a shape of the thermal component 344 may change. For example, the thermal component 344 has a first shape 344A (including the retaining features 348) while the thermal detection assembly 300 is in the first state 302. Exposure to temperatures that exceed the designated threshold causes one or more characteristics of the material of the thermal component 344 to change. For example, the thermal component may be manufactured of a fused material, a metal or metallic alloy, a soldering material, or the like. The material of the thermal component may have one or more properties that may change after exposure of the material to the temperatures that exceed a designated threshold, to temperatures that exceed the designated threshold for a determined length of time, or the like.

In one example, the material or material composition of the thermal component 344 may have one or more material properties that are the same as, substantially the same as, or similar to (e.g., within a determined percentage such as about 2%, about 5%, about 10%, or the like) one or more material properties of one or more materials of one or more layers of the first and/or second surfaces 306, 308. For example, the thermal component 344 may be manufactured of a material that has a thermal property that is the same as, substantially the same as, or similar to a thermal property of one or more materials of one or more layers of the first and/or second surfaces 306, 308 of the aircraft system. For example, the material of the thermal component 344 may have the same, substantially the same, and/or a similar (e.g., within a predetermined percentage threshold) melting point, thermal conductivity, thermal expansion, density, hardness, ductility, malleability, elasticity, or the like, as the material of one or more layers of the surfaces 306, 308.

As one example, the change in one or more characteristics of the thermal component 344 may cause the shape of the thermal component 344 to change from the first shape 344A to a different, second shape 344B shown in FIG. 4. The second shape 344B of the thermal component is changed such that the thermal component 344 is devoid the retaining features 348. In another example, the thermal component 344 in the second state 304 may include retaining features 348 that have a different size and/or shape. For example, exposure to temperatures exceeding the designated threshold may cause the retaining features 348 to deform.

As another example, the change in one or more characteristics of the thermal component 344 may cause a hardness of the material of the thermal component 344 to change. For example, the retention force that is exerted onto the third end 336 of the indicator device 334 by the retaining features 348 of the thermal component 344 may be less than the force generated by the spring device 342 that is exerted onto the flange 350. For example, the hardness of the material of the thermal component 344 prior to exposure to temperatures exceeding the designated threshold may be greater than the hardness of the material of the thermal component 344 after the exposure to temperatures exceeding the designated threshold, after the exposure to temperatures exceeding the designated threshold for the determined length of time, or the like.

The changing of the shape of the thermal component 344 and/or the reduction of hardness and/or strength of the thermal component 344 based at least on the exposure to temperatures exceeding the designated threshold allows the third end 336 of the indicator device 334 to disengage from the thermal component 344, thereby allowing the spring device 342 to move to a non-compressed and/or unloaded state. The spring device 342 moving to a non-compressed state encourages movement of the flange 350 of the indicator device 334 in the first direction 352 towards the opening 327 of the cavity 326. Additionally, moving the flange 350 towards the opening 327 by the spring device 342 causes a portion of the indicator device 334, including the fourth end 338 of the indicator device 334, to move out of the cavity 326 of the housing 310. For example, the disengagement of the indicator device from the thermal component 344 of the thermal spring system 340 allows the spring device 342 of the thermal spring system 340 to move the indicator device 334 from a first position to a different, second position.

In one example, the thermal component 344 and/or the spring device 342 may be manufactured of material(s) that have one or more properties that are similar to one or more properties of one or more layers of the first and/or second surfaces 306, 308 in order to indicate when the first and/or second surfaces 306, 308 may be exposed to thermal energy that may cause damage to the one or more layers. For example, the first layer 602 (e.g., the first layer of epoxy) and/or the third layer 606 (e.g., the second layer of epoxy) may be at risk of failing and/or may fail if the first and/or third layers 602, 606 are exposed to temperatures that exceed the designated threshold, but an operator of the aircraft system 100 may be unaware that the first and third layers were exposed to temperatures that exceed one or more design limitations. The thermal component 344 may be manufactured of a material that has the same and/or similar properties as the first and third layers 602, 606 in order to provide a visual indication to the operator of the aircraft system 100 that the first and third layers 602, 606 may have failed, may be at risk of failure, may require repair and/or replacement, or the like. For example, exposing the thermal component 344 and the first and third layers 602, 606 to temperatures that exceed the designated threshold may cause the material properties of the thermal component 344 and the first and third layers 602, 606 to change. Changing of the properties of the thermal component 344 causes the third end 336 of the indicator device 334 to disengage from the thermal component 344 and extend out of the cavity 326 by a distance 356 and be visible, such as to an operator doing a visual inspection of the nacelle 200 and/or propulsion system 108 of the aircraft system 100.

In one or more examples, the thermal component 344 may be manufactured of a material that has one or more material properties that change (e.g., return to) responsive to the thermal component 344 no longer being exposed to the temperatures exceeding the designated threshold. For example, subsequent to the indicator device 334 disengaging from the thermal component 344 and the indicator device 334 extending out of the cavity 326 (e.g., and visible to an operator, an inspection system such as a camera, or the like), the indicator device 334 may be able to re-engage with the thermal component 344. For example, the fourth end 338 of the indicator device 334 may be moved in the second direction 354 to compress the spring device 342 until the retaining features 348 re-engage with the third end 336 of the indicator device 334. For example, the thermal detection assembly 300 may be able to be used for one or more cycles of engaging and disengaging the indicator device 334 with the thermal component 344. In another example, the thermal detection assembly 300 may only be a single-use assembly such that the indicator device 334 may only move from an engaged position (e.g., shown in FIG. 3) to a disengaged position (e.g., shown in FIG. 4) one time.

In one or more examples, the aircraft system 100 may include plural thermal detection assemblies disposed at one or more different locations within the nacelle of the propulsion system 108. For example, plural thermal detection assemblies may be coupled with one or more different surfaces of the nacelle, surfaces of components of the propulsion system (e.g., the engine, combustor, fan ducts, or the like). The plural thermal detection assemblies may be positioned in a pattern or array along one or more surfaces, may be strategically positioned based on anticipated thermal damage due to thermal energy generated by the propulsion system, strategically positioned based on different materials of the nacelle and/or propulsion system (e.g., may be closed to and/or operably coupled with materials of the nacelle that are more easily damaged due to exposure to thermal energy relative to other materials that are less easily thermally damaged), or the like.

In one or more examples, the thermal component of different thermal detection assemblies may be manufactured of different materials. For example, a first group of thermal detection assemblies may be manufactured with a thermal component that is manufactured of a first type of solder material, and a second group of thermal detection assemblies may be manufactured with a thermal component that is manufactured of a second type of solder material. The first group of detection assemblies may be strategically positioned within the propulsion system proximate to materials of the propulsion system that have the same and/or similar material properties as the first type of solder. Additionally, the second group of detection assemblies may be strategically positioned within the propulsion system proximate to materials of the propulsion system that have the same and/or similar material properties as the second type of solder.

Figure 7:
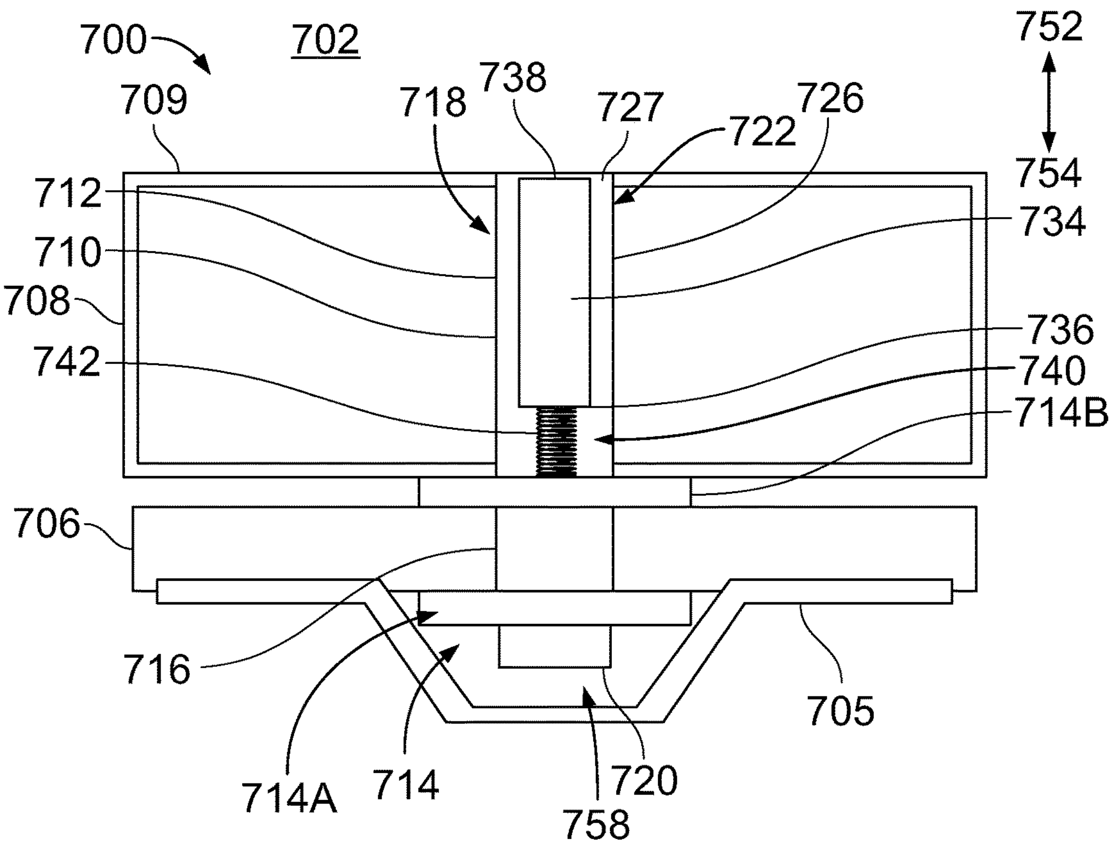
FIG. 7 illustrates a cross-sectional side view of a thermal detection assembly in a first state, according to an example of the present disclosure.
Figure 8:
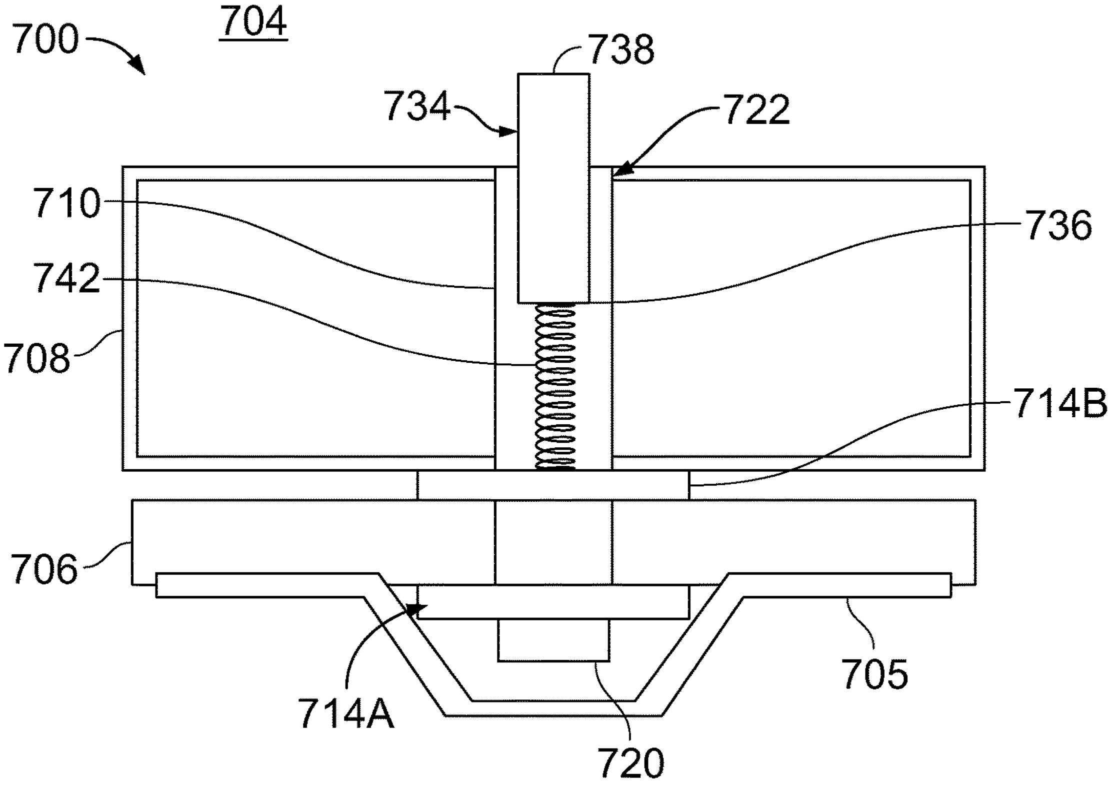
FIG. 8 illustrates a cross-sectional side view of the thermal detection assembly shown in FIG. 7 in a second state, according to an example of the present disclosure.

FIGS. 7 and 8 illustrates cross-sectional side views of a thermal detection assembly 700 in accordance with one embodiment. In the illustrated embodiment shown in FIG. 7, the thermal detection assembly 700 is in a compressed and/or loaded state 702. In the illustrated embodiment shown in FIG. 8, the thermal detection assembly 700 is in a non-compressed and/or unloaded state 704.

Like the thermal detection assembly 300 shown in FIGS. 3 and 4, the thermal detection assembly 700 includes a housing 710 that has a body 712 extending between a first end 720 and a second end 722. The housing 710 is disposed within a first passage 716 of a first surface 706 and a second passage 718 of a second surface 708. In the illustrated example, the first end 720 of the housing 710 extends through the first passage 716 of the first surface 706 and is operably coupled with the first surface 706 via one or more fastener components 714A and 714B. In one or more examples, the thermal detection assembly 700 can include a cap 705 that is operably coupled with the first surface 706. The cap 705 includes a recess 758, and the first end 720 of the housing 710 extends into the recess 758 of the cap 705. In one or more examples, the cap 705 may control an amount of thermal energy that is directed towards and/or onto the first end 720 of the housing 710, such as thermal energy that is generated by the propulsion system of the aircraft system 100.

The thermal detection assembly 700 includes an indicator device 734 that is disposed within a cavity 726 of the housing 710. The cavity 726 has an opening 727 at an exterior surface 709 of the second surface 708. The indicator device 734 extends between a third end 736 disposed within the cavity 726 and a fourth end 738 disposed proximate to the opening 727 of the cavity 726.

The thermal detection assembly 700 includes a thermal spring system 740 that is disposed within the cavity 726 of the housing 710. The thermal spring system 740 is engaged with the third end 736 of the indicator device 734 and controls a position of the indicator device 734 within the cavity 726. In the illustrated example, the thermal spring system 740 includes a spring device 742. The spring device 742 may be a compression spring that is positioned within the cavity 726 such that the indicator device 734 is positioned between the spring device 742 and the opening 727 of the cavity.

In one or more examples, the spring device 742 may be designed and/or manufactured to have a varying spring constant. For example, the spring device 742 may have a first spring constant prior to exposure of the spring device 742 to temperatures exceeding a designated threshold, and a different, second spring constant responsive to exposure of the spring device 742 to temperatures exceeding the designated threshold. The spring device 742 may be manufactured to have the varying spring constant such that the spring constant changes responsive to exposure to temperatures that also change one or more characteristics of one or more layers of the first and/or second surfaces 706, 708, respectively, of the aircraft system 100.

In the illustrated example shown in FIG. 7, the spring device 742 may have a first spring constant that causes the spring device 742 to have a first length. While the spring device 742 has the first length, the spring device 742 maintain a position of the indicator device 734 within the cavity such that the fourth end 738 of the indicator device 734 does not extend out of the cavity. For example, the indicator device 734 is not visible to an operator, an inspection system (e.g., cameras, lasers, or the like), or the like.

Alternatively, in the illustrated example shown in FIG. 8, responsive to exposure of the spring device 742 to temperatures exceeding the designated threshold, the spring device 742 may have a different, second spring constant that causes the length of the spring may change. For example, the length of the spring device 742 may increase responsive to the spring device 742 being exposed to the temperatures exceeding the designated threshold. Increasing the length of the spring causes the spring device 742 to move the indicator device 734 in a first direction 752 such that a portion of the indicator device 734, including the fourth end 738 of the indicator device 734, extends out the cavity 726. For example, the indicator device 734 is visible to an operator, inspection system, or the like.

In one or more examples, the spring device 742 may be designed and/or manufactured of a material that allows the spring constant to change from the second spring constant (e.g., with the spring having the longer length, shown in FIG. 8) back to the first spring constant (e.g., with the spring having the shorter length, shown in FIG. 7) responsive to the spring device 742 no longer being exposed to the temperatures exceeding the designated threshold. For example, subsequent to the length of the spring device 742 increasing and moving the fourth end 738 of the indicator device 734 out of the cavity 726, the length of the spring device 742 may be decreased and the fourth end 738 of the indicator device 734 may return to a position within the cavity 726. In one example, the indicator device 734 may be moved in a second direction 754 to compress the spring device 742 to the shorter length until the indicator device 734 is no longer visible. The spring device 742 may return to having the first spring constant (e.g., causing the spring device 742 to maintain or hold the shorter length of the spring device, as shown in FIG. 7). In one example, the thermal detection assembly 700 may be able to be used for one or more cycles of lengthening and shortening of the spring device 742. In alternative examples, the thermal detection assembly 700 may be a single-use assembly such that the length of the spring device 742 may not be able to be shortened responsive to the spring device 742 being compressed.

Further, the disclosure comprises examples according to the following clauses:

In one example, an assembly comprises:

a housing having a body extending between a first end and a second end, the first end of the housing configured to be operably coupled with a surface of a power system, the body of the housing extending through a passage of the surface of the power system, the housing including one or more interior surfaces defining a cavity, the cavity having an opening proximate the second end of the housing;

an indicator device configured to be disposed within the cavity of the housing; and a thermal spring system disposed within the cavity of the housing and configured to be engaged with the indicator device, the thermal spring system configured to maintain a position of the indicator device within the cavity, wherein one or more characteristics of the thermal spring system are configured to change responsive to the thermal spring system being exposed to a temperature exceeding a designated threshold, and wherein the thermal spring system is configured to control movement of the indicator device to move the indicator device from a first position to a different, second position responsive to the one or more characteristics of the thermal spring system changing, a portion of the indicator device configured to move out of the cavity of the housing responsive to the thermal spring system moving the indicator device to the second position.

Optionally, the surface of the power system can include plural layers, wherein one or more characteristics of one or more of the plural layers are configured to change responsive to the plural layers being exposed to the temperature exceeding the designated threshold.

Optionally, the thermal spring system can to disengage from a second portion of the indicator device responsive to the one or more characteristics of the thermal spring system changing, wherein the thermal spring system is configured to encourage the first portion of the indicator device to move out of the cavity of the housing responsive to the thermal spring system disengaging from the second portion of the indicator device.

The surface of the power system may include plural layers operably coupled with each other, wherein the thermal spring system is manufactured of one or more materials, wherein at least one of the plural layers and at least one of the one or more materials of the thermal spring system have a common material property.

Optionally, the one or more characteristics of the thermal spring system are configured to change responsive to the thermal spring system being exposed to the temperature exceeding the designated threshold for a determined length of the time.

In some embodiments, the thermal spring system can include a spring device and a thermal component, the indicator device extending between a third end and a fourth end, wherein the spring device is configured to be operably coupled with the indicator device at a location between the third end and the fourth end of the indicator device, and the thermal component is configured to be operably coupled with the third end of the indicator device.

Optionally, the spring device is configured to be in a compressed state prior to the thermal spring system being exposed to the temperature exceeding the designated threshold, and the spring device is configured to be in a non-compressed state responsive to the thermal spring system being exposed to the temperature exceeding the designated threshold.

The thermal component may have a first shape prior to the thermal spring system being exposed to the temperature exceeding the designated threshold, and the thermal component may have a different, second shape responsive to the thermal spring system being exposed to the temperature exceeding the designated threshold.

In some embodiments, the thermal spring system includes a spring device, wherein one or more characteristics of the spring device are configured to change responsive to the spring device being exposed to the temperature exceeding the designated threshold.

Optionally, the spring device has s first spring constant prior to the spring device being exposed to the temperature exceeding the designated threshold, and the spring device is configured to have a different, second spring constant responsive to the thermal spring system being exposed to the temperature exceeding the designated threshold.

Optionally, the power system is an aircraft system, and the surface of the power system is a surface of a propulsion system of the aircraft system.

In one or more embodiments, an assembly may comprise:

a housing having a body extending between a first end and a second end, the first end of the housing configured to be operably coupled with a surface of a power system, the body of the housing extending through a passage of the surface of the power system, the housing including one or more interior surfaces defining a cavity, the cavity having an opening proximate the second end of the housing;

an indicator device configured to be disposed within the cavity of the housing, the indicator device extending between a third end and a fourth end, the fourth end of the indicator device disposed proximate the opening of the cavity; and a thermal spring system disposed within the cavity of the housing and configured to be engaged with the indicator device, the thermal spring system configured to maintain a position of the indicator device within the cavity, the thermal spring system including a spring device and a thermal component, wherein the spring device is configured to be operably coupled with the indicator device at a location between the third end and the fourth end of the indicator device, and the thermal component is configured to be operably coupled with the third end of the indicator device, wherein one or more characteristics of the thermal component are configured to change responsive to the thermal component of the thermal spring system being exposed to a temperature exceeding a designated threshold, wherein the thermal spring system is configured to control movement of the indicator device to move the indicator device from a first position to a second position responsive to the one or more characteristics of the thermal component changing, a portion of the fourth end of the indicator device configured to move out of the cavity of the housing responsive to the thermal spring system moving the indicator device from the first position to the second position.

Optionally, the one or more characteristics of the thermal component may change responsive to the thermal component being exposed to the temperature exceeding the designated threshold for a determined length of time.

Optionally, the third end of the indicator device may disengage from the thermal spring system, wherein the spring device is configured to encourage the fourth end of the indicator device to move out of the cavity of the housing responsive to the third end of the indicator device disengaging from the thermal component of the thermal spring system.

Optionally, the surface of the power system may include plural layers, wherein one or more characteristics of one or more of the plural layers are configured to change responsive to the plural layers being exposed to the temperature exceeding the designated threshold.

Optionally, the spring device may be in a compressed state prior to the thermal component being exposed to the temperature exceeding the designated threshold, and the spring device may be in a non-compressed state responsive to the thermal spring system being exposed to the temperature exceeding the designated threshold.

Optionally, the thermal component may have a first shape prior to the thermal component being exposed to the temperature exceeding the designated threshold, and the thermal component may have a different, second shape responsive to the thermal spring system being exposed to the temperature exceeding the designated threshold.

Optionally, the surface of the power system includes plural layers operably coupled with each other, wherein a material of the thermal component of the thermal spring system and at least one of the plural layers have a common material property.

Optionally, the power system is an aircraft system, and wherein the surface is a surface of a propulsion system of the aircraft system.

In one or more embodiments, a thermal detection assembly can include:

a housing having a body extending between a first end and a second end, the first end of the housing configured to be operably coupled with a surface of a propulsion system of an aircraft system, the body of the housing extending through a passage of the surface of the aircraft system, the housing including one or more interior surfaces defining a cavity, the cavity having an opening proximate the second end of the housing;

an indicator device configured to be disposed within the cavity of the housing; and a thermal spring system disposed within the cavity of the housing and configured to be engaged with the indicator device, the thermal spring system configured to maintain a position of the indicator device within the cavity, wherein one or more characteristics of the thermal spring system are configured to change responsive to the thermal spring system being exposed to an amount of thermal energy generated by the propulsion system exceeding a designated threshold, and wherein the thermal spring system is configured to encourage a portion of the indicator device to move out of the cavity of the housing responsive to the one or more characteristics of the thermal spring system changing.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An assembly, comprising:

a power system comprising a first surface and a second surface;

a housing operably coupled with the power system, the housing having a body extending between a first end and a second end, the body of the housing extending through passages of the first surface and the second surface of the power system, the housing including one or more interior surfaces defining a cavity, the cavity having an opening proximate the second end of the housing;

an indicator device configured to be disposed within the cavity of the housing; and a thermal spring system disposed within the cavity of the housing and configured to be engaged with the indicator device, the thermal spring system configured to maintain a position of the indicator device within the cavity, wherein one or more characteristics of the thermal spring system are configured to change responsive to the thermal spring system being exposed to a temperature exceeding a designated threshold, and wherein the thermal spring system is configured to control movement of the indicator device to move the indicator device from a first position to a different, second position responsive to the one or more characteristics of the thermal spring system changing, wherein the indicator device is completely retracted within the cavity of the housing while the indicator device is in the first position, and wherein a first portion of the indicator device is configured to move out of the cavity of the housing responsive to the thermal spring system moving the indicator device to the second position.

2. The assembly of claim 1, wherein one or more characteristics of one or more of the first surface or the second surface of the power system are configured to change responsive to the first surface and the second surface being exposed to the temperature exceeding the designated threshold.

3. The assembly of claim 1, wherein the thermal spring system is configured to disengage from a second portion of the indicator device responsive to the one or more characteristics of the thermal spring system changing, wherein the thermal spring system is configured to encourage the first portion of the indicator device to move out of the cavity of the housing responsive to the thermal spring system disengaging from the second portion of the indicator device.

4. The assembly of claim 1, wherein the thermal spring system is manufactured of one or more materials, wherein at least one of the first surface or the second surface of the power system and at least one of the one or more materials of the thermal spring system have a common material property.

5. The assembly of claim 1, wherein the one or more characteristics of the thermal spring system are configured to change responsive to the thermal spring system being exposed to the temperature exceeding the designated threshold for a determined length of time.

6. The assembly of claim 1, wherein the power system is an aircraft system, and the first and second surfaces of the power system are surfaces of a propulsion system of the aircraft system.

7. The assembly of claim 1, wherein the thermal spring system includes a spring device and a thermal component, the indicator device extending between a third end and a fourth end, wherein the spring device is configured to be operably coupled with the indicator device at a location between the third end and the fourth end of the indicator device, and the thermal component is configured to be operably coupled with the third end of the indicator device.

8. The assembly of claim 7, wherein the spring device is configured to be in a compressed state prior to the thermal spring system being exposed to the temperature exceeding the designated threshold, and the spring device is configured to be in a non-compressed state responsive to the thermal spring system being exposed to the temperature exceeding the designated threshold.

9. The assembly of claim 7, wherein the thermal component has a first shape including retraining features prior to the thermal spring system being exposed to the temperature exceeding the designated threshold, and the thermal component is configured to have a different, second shape excluding the retraining features responsive to the thermal spring system being exposed to the temperature exceeding the designated threshold.

10. An assembly, comprising:

a power system comprising a first surface and a second surface;

a housing operably coupled with the power system, the housing having a body extending between a first end and a second end, the body of the housing extending through passages of the surface first and second surfaces of the power system, the housing including one or more interior surfaces defining a cavity, the cavity having an opening proximate the second end of the housing;

an indicator device configured to be disposed within the cavity of the housing, the indicator device extending between a third end and a fourth end, the fourth end of the indicator device disposed proximate the opening of the cavity; and a thermal spring system disposed within the cavity of the housing and configured to be engaged with the indicator device, the thermal spring system configured to maintain a position of the indicator device within the cavity, the thermal spring system including a spring device and a thermal component, wherein the spring device is configured to be operably coupled with the indicator device at a location between the third end and the fourth end of the indicator device, and the thermal component is configured to be operably coupled with the third end of the indicator device, wherein one or more characteristics of the thermal component are configured to change responsive to the thermal component of the thermal spring system being exposed to a temperature exceeding a designated threshold, wherein the thermal spring system is configured to control movement of the indicator device to move the indicator device from a first position to a second position responsive to the one or more characteristics of the thermal component changing, wherein the indicator device is completely retracted within the cavity of the housing while the indicator device is in the first position, and wherein a portion of the fourth end of the indicator device is configured to move out of the cavity of the housing responsive to the thermal spring system moving the indicator device from the first position to the second position.

11. The assembly of claim 10, wherein the one or more characteristics of the thermal component are configured to change responsive to the thermal component being exposed to the temperature exceeding the designated threshold for a determined length of time.

12. The assembly of claim 10, wherein the third end of the indicator device is configured to disengage from the thermal spring system responsive to the one or more characteristics of the thermal spring system changing, wherein the spring device is configured to encourage the fourth end of the indicator device to move out of the cavity of the housing responsive to the third end of the indicator device disengaging from the thermal component of the thermal spring system.

13. The assembly of claim 10, wherein one or more characteristics of one or more of the first surface or the second surface of the power system are configured to change responsive to the first and second surfaces being exposed to the temperature exceeding the designated threshold.

14. The assembly of claim 10, wherein the spring device is configured to be in a compressed state prior to the thermal component being exposed to the temperature exceeding the designated threshold, and the spring device is configured to be in a non-compressed state responsive to the thermal spring system being exposed to the temperature exceeding the designated threshold.

15. The assembly of claim 10, wherein the thermal component has a first shape including retaining features prior to the thermal component being exposed to the temperature exceeding the designated threshold, and the thermal component is configured to have a different, second shape excluding the retraining features responsive to the thermal spring system being exposed to the temperature exceeding the designated threshold.

16. The assembly of claim 10, wherein the thermal component is manufactured of a material that has a common material property of at least one of the first surface or the second surface of the power system.

17. The assembly of claim 10, wherein the power system is an aircraft system, and wherein the first and second surfaces are surfaces of a propulsion system of the aircraft system.

18. A thermal detection assembly, comprising:

a housing having a body extending between a first end and a second end, the first end of the housing configured to be operably coupled with a surface of a propulsion system of an aircraft system, the body of the housing extending through a passage of the surface of the aircraft system, the housing including one or more interior surfaces defining a cavity, the cavity having an opening proximate the second end of the housing;

an indicator device configured to be disposed within the cavity of the housing; and a thermal spring system disposed within the cavity of the housing and configured to be engaged with the indicator device, the thermal spring system configured to maintain a position of the indicator device completely retracted within the cavity, wherein one or more characteristics of the thermal spring system are configured to change responsive to the thermal spring system being exposed to an amount of thermal energy generated by the propulsion system exceeding a designated threshold for a determined length of time, and wherein the thermal spring system is configured to encourage a portion of the indicator device to move out of the cavity of the housing responsive to the one or more characteristics of the thermal spring system changing.

* * * * *